United States Patent [19]

Fykse

[11] Patent Number: 5,224,323
[45] Date of Patent: Jul. 6, 1993

[54] BALE WRAPPER APPARATUS

[75] Inventor: Njaal Fykse, Naerbo, Norway

[73] Assignee: Kverneland Underhaug AS, Naerbo, Norway

[21] Appl. No.: 778,176

[22] PCT Filed: May 20, 1990

[86] PCT No.: PCT/US90/00822
§ 371 Date: Dec. 13, 1991
§ 102(e) Date: Dec. 13, 1991

[87] PCT Pub. No.: WO90/13995
PCT Pub. Date: Nov. 29, 1990

[30] Foreign Application Priority Data

May 26, 1989 [GB] United Kingdom ................. 8912186

[51] Int. Cl.⁵ .............................................. A01D 39/00
[52] U.S. Cl. ........................................ 53/211; 53/287; 56/218
[58] Field of Search ................. 53/211, 214, 587, 566; 56/218, 210, 208, DIG. 14

[56] References Cited

U.S. PATENT DOCUMENTS

| 4,018,036 | 4/1977 | Cicci ................. 56/218 X |
| 4,641,484 | 2/1987 | Popelka . |
| 4,685,270 | 8/1987 | Brambilla ............. 53/211 X |
| 4,934,131 | 6/1990 | Frisk et al. .......... 56/218 X |
| 4,972,656 | 11/1990 | Haugstad ............. 53/211 X |

FOREIGN PATENT DOCUMENTS

| 0336739A2 | 10/1989 | European Pat. Off. . |
| 2400830 | 8/1977 | France . |
| 2159489 | 12/1985 | United Kingdom ................. 53/211 |

Primary Examiner—James F. Coan
Attorney, Agent, or Firm—Merchant, Gould, Smith, Edell, Welter & Schmidt

[57] ABSTRACT

There is disclosed a bale wrapper apparatus (10) which can apply stretchable plastics film around a round-bale (17) and which comprises a main frame (13) which can be coupled to the front or rear of a propelling vehicle (12), a turntable (16) mounted on the main frame (13) and adapted to receive a round-bale (17) thereon with its axis (18) extending substantially horizontally, means (19, 20) for rotating the bale (17) about its axis (18), and means for rotating the turntable (16) about a vertical axis (21) so that film withdrawn from a film dispenser reel (not shown) can automatically apply air tight wrapping around the bale upon rotation of the bale about its axis (18) and rotation of the turntable about axis (21). An automatic film applicator (not shown) is mounted on the turntable and automatically cuts the film after a bale has been wrapped, and holds the cut end to apply this to a newly deposited bale on the turntable. A pick-up mechanism (23) is mounted at the front of the apparatus, with respect to its direction of forward travel, and in the operative position of the apparatus (10) it will be laterally off-set with respect to the propelling vehicle (12), so that the pick-up mechanism (23) can be aligned with a row of bales (17) lying on the ground, and the propelling vehicle can therefore move forwards in a straight line along side the row of bales in order that each bale can be received in turn by gripping arms (25) of the pick-up mechanism, and then transferred rearwardly onto the turntable 916) so that bale wrapping can take place.

7 Claims, 3 Drawing Sheets

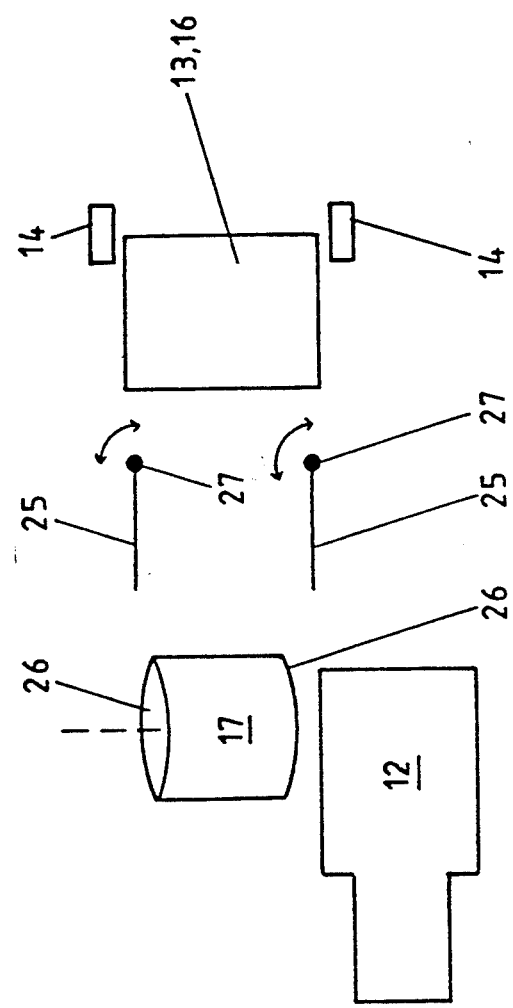
FIG. 4(a)
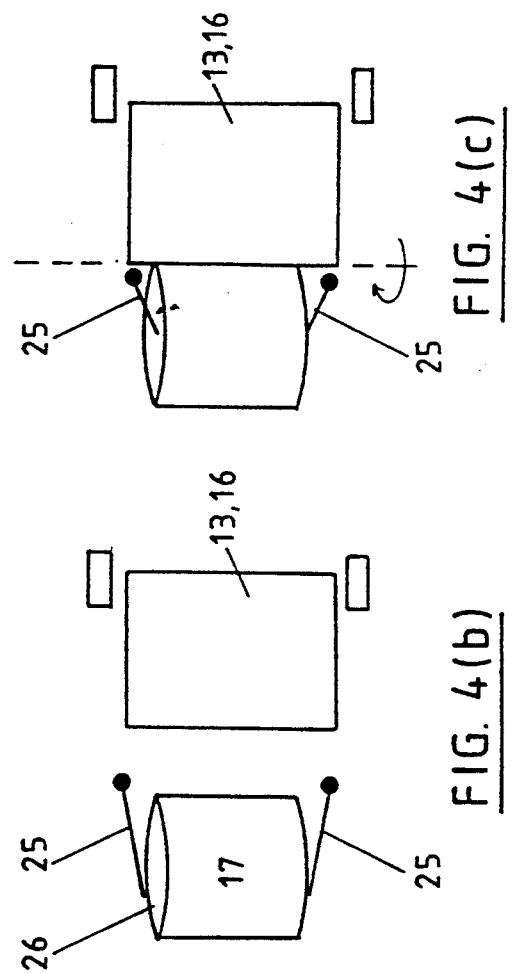
FIG. 4(c)
FIG. 4(b)
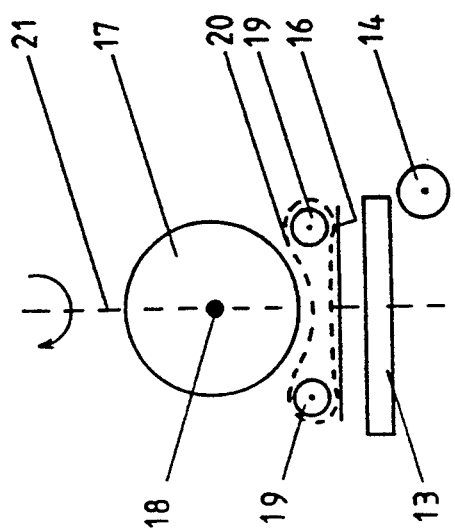
FIG. 3

BALE WRAPPER APPARATUS

This invention relates to a bale wrapper apparatus which is primarily intended for use in applying plastics film wrapping around a round-bale of cut grass or straw in substantially airtight manner, so as to enable the wrapped bale to be stored for future use of the contents of the wrapped bale when required.

Bale wrapper apparatus are used to wrap a round-bale of straw, in order to shield the straw from exposure to the weather, so that dry straw material can be fed to animals, or used as bedding when required. Bales of straw can also be treated with ammonia, prior to wrapping, so that fermentation of the straw can take place during storage, and which enhances the nutritional content of the straw when fed to animals subsequently.

Bale wrappers are also used to wrap newly formed bales of cut grass, and by virtue of the substantially airtight wrapping of the bales which is possible, the grass matures into silage over a period of time, and this also is a very valuable source of food for animals.

The use of bale wrappers to form silage from bales of grass is growing rapidly, since it avoids the need for silage towers and silage "clamps" to be used. Substantial capital outlay is required to install silage towers, and there is also a considerable problem, both with silage towers and silage clamps, concerning the inevitable generation of silage effluent. This has to be carefully collected, and then disposed of in an approved manner, and there are substantial financial penalties applied when unathorised disposal of silage effluent is allowed to take place. For this reason, therefore, bale wrappers are now being used to a rapidly increasing extent to wrap round-bales of grass, which can then be stored through the summer, autumn and winter months, during which time densely packed grass ferments to form silage, and which is readily available for feeding to animals when required.

One bale wrapper apparatus which is being sold widely throughout Great Britain and Europe, and elsewhere, is known as a Silawrap Machine which is manufactured by Underhaug AG and which forms the subject of GB patent 2159489B and foreign equivalents.

Reference is directed to this patent specification, for a fuller disclosure of the means by which bale wrapper apparatus of this type can be used to apply a plastics film of stretchable material around a bale while the bale is rotated simulataneously about a horizontal and a vertical axis. This takes place by virtue of the placement of the round-bale on a turntable, with the axis of the bale extending substantially horizontally, and rollers provided on the turntable are driven so as to rotate the bale about its horizontal axis. Simultaneously, the entire turntable is rotated about a vertical axis, and by virtue of this simultaneous rotation of the bale about horizontal and vertical axes, a sheet of strechable film withdrawn from a dispenser reel and initially attached to the bale can form a substantially airtight wrapping around the bale.

There are two main types of bale wrapper in use at the present, namely mobile bale wrappers which can be trailed behind a tractor to be used in a field, and bale wrappers which will normally be used at a fixed location, e.g. in a stackyard.

The present invention is primarily concerned with a mobile bale wrapper which can be moved through a field and can automatically pick up bales lying on the ground and then carry out a bale wrapping operation thereon. One version of the Silawrap bale wrapper made by Underhaug has a side mounted pick-up mechanism which enables a newly deposited bale lying on the ground to be automatically engaged by the pick-up mechanism as the bale wrapper apparatus is moved forwardly, and the mechanism can then be operated to raise the bale from the ground and then to transfer the bale laterally so as to be deposited on the turntable. Wrapping of the bale then takes place, followed by rearward tilting of the turntable in order to deposit the wrapped bale on the ground.

This side mounted pick-up mechanism increases the overall width of the bale wrapper apparatus substantially, which can make it difficult to manoeuvre through gateways and other narrow access points, and also it is usually generally necessary for the apparatus, and any propelling vehicle, to remain stationary while the bale is being lifted and laterally transferred onto the table, and also during the bale wrapping operation.

In one aspect the present invention seeks to provide a rotating turntable type bale wrapper apparatus which has a bale pick-up mechanism mounted thereon in such a way as not to increase to an appreciable extent the overall width of the apparatus, and yet which can permit also bale loading and wrapping to take place while the apparatus is being propelled forwardly, e.g. to engage and pick up the next bale lying in a row in a field.

A further drawback of the known side mounted pick-up mechanism is that by virtue of its construction, it can only engage and lift bales when advanced towards a bale lying on the ground in a direction parallel to the central axis of the generally cylindrical round-bale. Therefore, since most round-bales are discharged from existing constructions of baler to the rear of the baler and with the central axis of the bale extending perpendicular to the direction of movement of the baler, the propelling vehicle (e.g. a tractor propelling the bale wrapper apparatus with the side mounted pick-up) mechanism has to follow a generally S-shaped path in order to engage each bale lying in a row in a field. By contrast, as will become apparent from the subsequent detailed description of a preferred embodiment of the invention, round-bales lying in a row in a field (with the axes of the bales extending perpendicular to the direction of the row) can be engaged while the propelling vehicle (to which the bale wrapper apparatus of the invention is coupled) moves generally rectilinearly and parallel to the direction of the row.

Acording to one aspect of the invention there is provided:

a round-bale wrapper apparatus (10) which is capable of being attached to the rear of a propelling vehicle (12) and which comprises:

a main frame (13):

a pair of laterally spaced rollers (19) arranged to receive a round bale (17) and operable to rotate the bale about its axis (18):

means for applying a stretchable plastics film around the bale (17) while the roller is rotated about its axis (18) in order to apply wrapping around the bale;

a drawbar (15) connected to the main frame (13) and which can be attached to a towing hitch (11) at the rear of the propelling vehicle (12); and an adjustment device (24) operable to vary the inclination of the drawbar (15) relative to the main frame (13).

According to a second aspect of the invention there is provided a round-bale wrapper apparatus which is capable of being mounted on, or attached to a propelling vehicle, and which comprises:

a main frame which can be coupled to the front or rear of the propelling vehicle;

a turntable mounted on the main frame and adapted to receive a round-bale thereon with its axis extending substantially horizontally, said turntable being operative to rotate the bale about its axis, and the turntable with the bale thereon also being rotatable about a substantially verticle axis;

means for mounting a film dispenser reel on the main frame, whereby in service film can be withdrawn from the reel and attached to the bale so that upon rotation of the bale about its axis and rotation of the turntable, the film can be automatically applied around the bale to form wrapping thereon; and a pick-up mechanism mounted at the front of the apparatus, with respect to its direction of forward travel, and operative to engage a bale lying on the ground and to transfer the bale rearwardly onto the turntable so that bale wrapping can take place.

Thus, in use of the apparatus of the invention, bales lying in a row on the ground can be approached by substantially straight line travel, and with the axes of the bales extending substantially perpendicular to the direction of the row, and which bales can be automatically engaged by the pick-up mechanism and then transferred rearwardly onto the turntable. The bale engagement, transfer and wrapping operations may take place while the apparatus and the propelling vehicle are "on the move", and in transit to the next bale in the row.

The apparatus may be mounted at the front or rear of the vehicle, e.g. a tractor, though in a preferred arrangement the apparatus is arranged to be mounted on the rear of a tractor, but with the pick-up mechanism laterally offset with respect to the general longitudinal axis of the tractor so that the tractor can move forwardly in a generally straight line parallel to and on one side of the row of bales.

In one preferred embodiment, the apparatus forms a towed wheel supported apparatus which can be connected by a draw bar to the usual towing hitch at the rear of the tractor. Preferably, the drawbar is pivotally connected to the main frame, and is also connected by an adjustment device to the main frame so that the inclination of the drawbar to the main frame can be adjusted by any amount sufficient to move the apparatus laterally of the tractor so that the pick-up mechanism can be aligned with a row of bales. The drawbar and adjustment device are arranged so that the wheel supported main frame can move forwardly in a direction parallel to the direction of motion of the tractor and with an amount of lateral offset to suit the requirements of the driver, i.e. how close he may wish to drive the tractor alongside the row of bales.

When the apparatus is arranged to be towed behind a tractor, during operation in a field it will be laterally offset. However, during transport to and from the field e.g. through narrow access points or on the highway, the drawbar can be adjusted so that the apparatus is substantially in line with and directly follows the tractor.

The pick-up mechanism may comprise a pair of laterally spaced arms which can embrace the end faces of a bale on the ground, and of which at least one arm can be moved so as to cause the end faces of the bale to be firmly gripped between the arms. This may be achieved by arranging for said one arm to be pivoted inwardly to engage its respective bale end face, though conveniently both arms can be pivoted inwardly.

The arms of the pick-up mechanism may form part of a bale support cradle which can move between a first position for engaging and gripping a bale lying on the ground and a second position in which the gripped bale can be transferred onto the turntable.

Conveniently, a ram is coupled with the arms and is operative to move the arms to a bale gripping position, and a further ram may be coupled with the cradle to move the cradle between its first and second positions. Preferably, the cradle is pivoted between its first and second positions about a substantially horizontal axis, whereby a bale gripped between the two arms can be raised from the ground by carrying out an arc of movement, and then can fall under gravity onto the turntable upon release of the bale by the gripping arms.

It should be understood that the cradle arm assembly is just one example of a front mounted pick-up mechanism which may be provided in a bale wrapper apparatus according to the invention, and other means may be adopted. For example, the pick-up mechanism may comprise a guide plate or table which can be moved forwardly to engage under a bale, and which can then be raised so as to transfer the bale onto the turntable. The plate may therefore be pivotally mounted on the main frame for movement about a substantially horizontal axis between its bale-engaging position and its bale transfer position, with the bale rolling under gravity from the plate or table onto the turntable.

Preferably, the turntable is carried by a subframe which is pivotally mounted on the main frame for movement between the substantially horizontal bale-receiving and wrapping position, and a tilted position in which the wrapped bale can be discharged under gravity onto the ground at the rear of the apparatus.

The wheels supporting the main frame may be arranged at the rear end of the main frame, so that upon tilting of the subframe only a small vertical drop takes place of the bale from the turntable onto the ground, in order to minimise the risk of damage or piercing of the wrapping taking place.

One embodiment of bale wrapper apparatus according to the invention will now be described in detail, by way of example only, with reference to the accompanying schematic drawings, in which:

FIG. 3 is a side view showing a round-bale received by a turntable of the apparatus ready to undergo a bale wrapping operation;

FIGS. 4a to 4e show sucessive stages in the reception, engagement, raising and transfer of a bale from the ground to the turntable.

Figure 1:
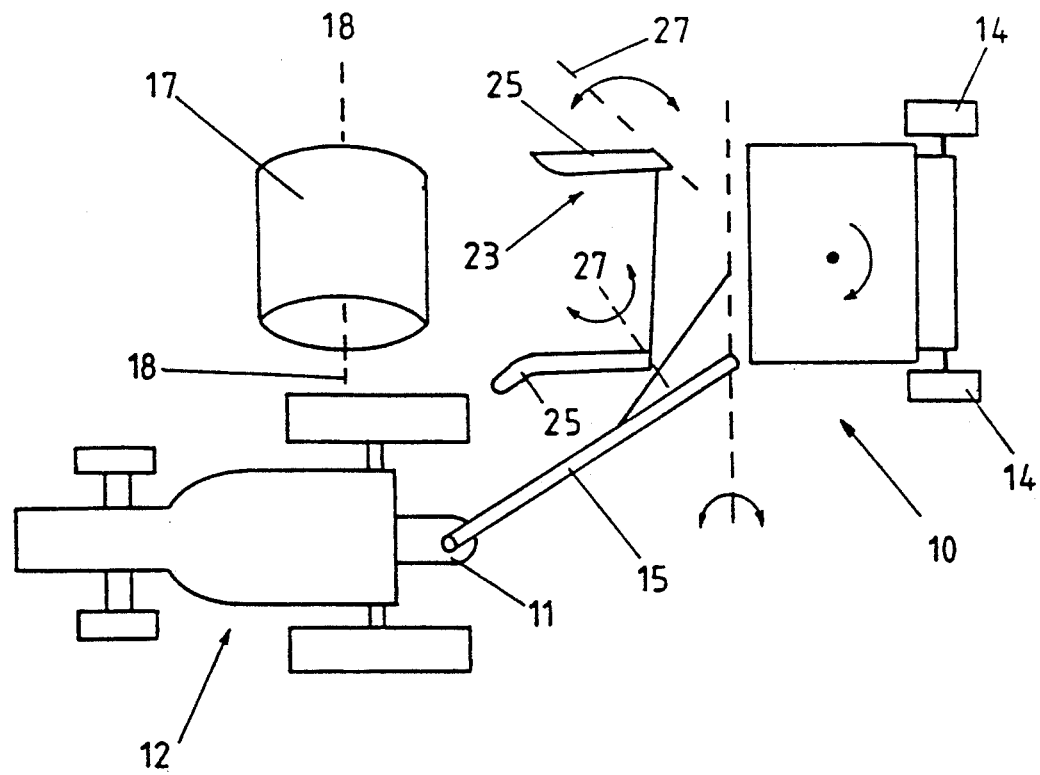
FIG. 1 is a plan view, in schematic form, of a round-bale wrapper apparatus which is attached to the rear of a tractor.

Referring now to the drawings, the illustrated embodiment of round-bale wrapper apparatus according to the invention is designated generally by reference 10 and intended to be attached to the rear of a propelling vehicle which, in the illustrated embodiment, comprises the rear towing hitch 11 of a tractor 12. However, it should be understood that the invention is not restricted to a towed bale wrapper apparatus, and that the invention includes a bale wrapper apparatus which can be mounted on the usual three-point hitch at the rear of a tractor, or indeed can be front mounted on the tractor. In addition, while the illustrated embodiment comprises a rotating turntable type of bale wrapper apparatus, the invention is not restricted to this means for applying wrapping around a rotating bale. Thus, although not shown, an orbiting arrangement of film dispenser reel may be provided, which can cause a film dispenser reel to rotate in a horizontal plane about a vertical axis and around a bale on spaced apart rollers, and which applies helical winding around the bale while the latter is rotated by the rollers about a horizontal axis.

The apparatus 10 comprises a main frame 13 supported at its rear end by wheels 14 and which is coupled with the rear towing hitch 11 of the tractor 12 by means of a drawbar 15. A turntable 16 is mounted on the main frame 13 and is adapted to receive a round-bale 17 thereon, with the axis 18 of the bale 17 extending substantially horizontal. The turntable 16 has rollers 19 and an arrangement of belts 20 which can rotate the bale 17 about its axis 18, in known manner e.g. as is carried out on the Silawrap machines, or as disclosed in GB patent 2156489B. In addition, the turntable 16 can be driven to rotate about a substantially vertical axis 21 (FIG. 3), simultaneously with the rotation of the bale 17 about its axis 18.

Figure 5:
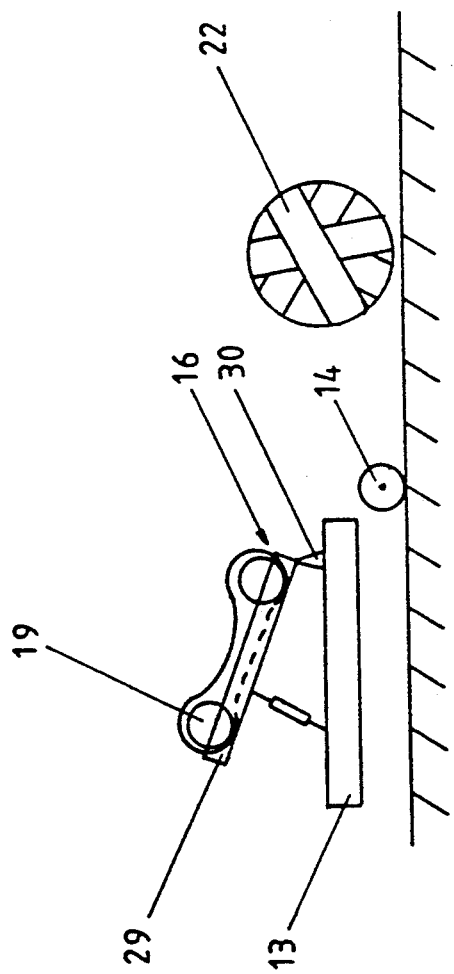
FIG. 5 is a side view showing the discharge of a wrapped bale to the rear of the apparatus.

Means, (not shown) is provided for mounting a film dispenser reel on the main frame 13, and in service film is withdrawn from the reel and attached to the bale 17 so that, upon rotation of the bale 17 about axis 18 and rotation of turntable 16 about axis 21, the film can be automatically applied around the bale to form wrapping thereon. A bale 17 with airtight wrapping 22 thereon is shown in FIG. 5, after rearward discharge from the turntable 16. An automatic applicator (not shown) may be mounted on the turntable and operate automatically to apply the fee end of the film (which will have been cut following a previous bale wrapping operation) to the newly deposited bale on the turntable, and the applicator maintaining the film adjacent the bale during the initial stage of wrapping, and then can move away from the bale. Once wrapping is completed, the applicator can operate automatically to cut the length of film extending between the reel and the wrapped bale to allow the wrapped bale to be discharged. The cut end of film is held by the applicator ready for application to the next bale.

Figure 4E:
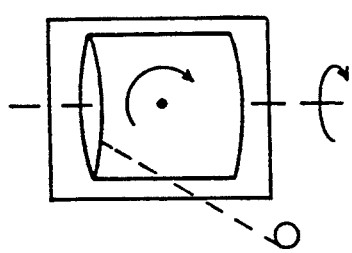

A pick-up mechanism is mounted at the front of the apparatus 10 and is designated generally by reference 23. The pick-up mechanism 23 is operative to engage bale 17 lying on the ground and to transfer the bale 17 rearwardly onto the turntable 16, as can be seen from the consecutive stages illustrated in FIGS. 4a to 4e. FIG. 4e shows schematically film being withdrawn from a dispenser reel to wrap the bale while the latter is rotated simultaneously about vertical and horizontal axes. Following transfer onto the turntable 16, bale wrapping can then take place, followed by rearward discharge as shown in FIG. 5.

Thus, in use of the apparatus, bales lying in a row on the ground can be approached by substantially straight line travel, and with the axes 18 of the bales extending substantially perpendicular to the direction of the row, following rearward discharge from a baler. These bales can be automatically engaged by the pick-up mechanism 23, and then transferred rearwardly onto the turntable. The bale engagement, transfer and wrapping operation can take place while the apparatus 10 and tractor 12 are in transit to the next bale in the row.

Figure 2A:
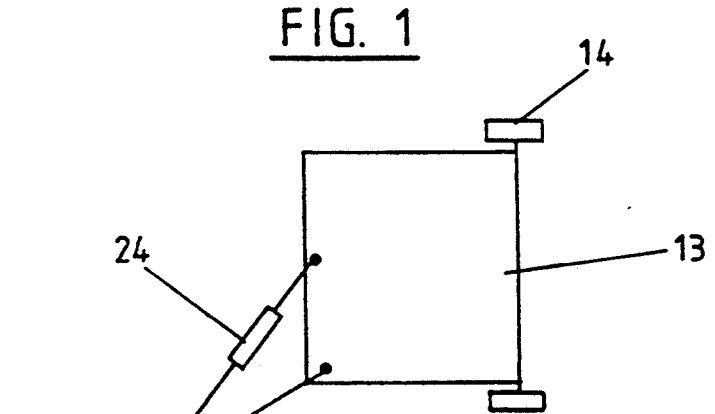
FIG. 2a and 2b show two alternative positions of adjustment of a drawbar by which the apparatus can be coupled to the rear of the tractor.
Figure 2B:
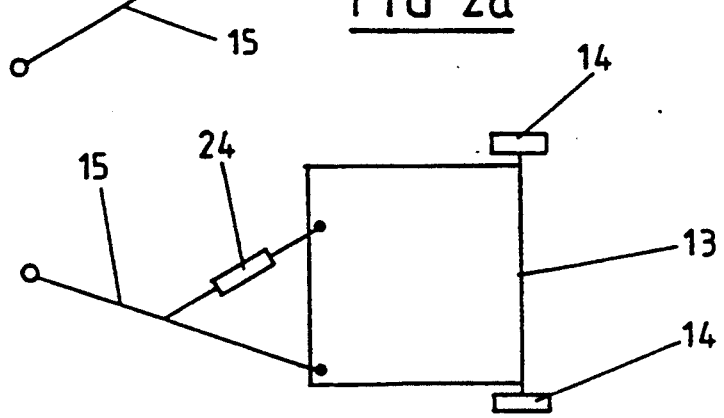

The apparatus 10 is shown in FIG. 1 in a laterally offset and operative position with respect to the tractor 12, so that the driver of the tractor can drive in a straight line parallel to and along-side the row of bales, and with the pick-up mechanism 23 automatically engaging the bales successively in the row. The amount of lateral offset of the apparatus 10 may be adjusted to suit the requirements of the driver, by pivotal adjustment of the drawbar 15 relative to the main frame 13 of the apparatus. There is therefore an adjustment device 24, which is preferably a ram, which can be operated to pivot the drawbar 15 between a laterally offset and operative position shown in FIG. 2a, and a substantially in-line transport position shown in FIG. 2b, in which the apparatus can directly follow the tractor. Throughout the adjustment of the drawbar 15, the wheels 14 will remain able to propel the apparatus 10 in a direction parallel to the direction of motion of the propelling vehicle.

The pick-up mechanism 23 shown schematically in the drawings comprises a pair of laterally spaced arms 25 which can embrace the end faces 26 of bale 17 lying on the ground, and at least one of the arms 25 is arranged to be moved to cause the end faces 26 to be firmly gripped between the arms 25. In the illustrated schematic arrangement, both arms 25 can be pivoted inwardly about respective substantially vertical axes 27 by any suitable power means, such as a ram, in order to engage and grip the respective bale end face 26.

Figure 4D:
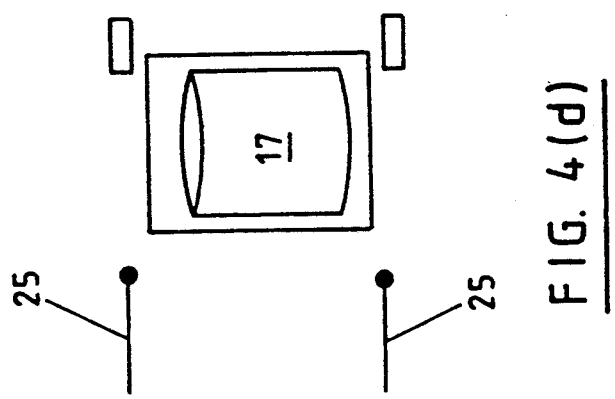

The arms 25 of the pick-up mechanism 23 form part of a bale support cradle which can move between a first position suitable for engaging and gripping a bale lying on the ground, as shown in FIG. 1 and FIGS. 4a and 4b, and a second position in which the gripped bale can be transferred onto the turntable, as shown in FIGS. 4c and 4d. FIG. 4c shows an intermediate and partly raised position of the gripped bale between the ground engaging position of FIG. 4b and the deposited position on the turntable of FIG. 4d. The cradle which forms the pick-up mechanism is pivotally adjusted for movement through an arc of movement about a substantially horizontal pivot axis 28 as shown in FIG. 4c.

One ram (not shown) may be coupled with both of the arms 25 in order to pivot them between engaging and release positions, and a further ram (not shown) may be coupled with the cradle in order to move the cradle (and a bale gripped thereby) bodily from its first position to its second position.

It should be understood, however, that the cradle arm assembly shown schematically in the drawings is just one example of a front mounted pick-up mechanism which may be provided in an embodiment of apparatus according to the invention. Other means may be adopted, such as the use of a guide plate or table (not shown) which can be moved forwardly to engage under a bale as the apparatus is propelled forwardly, and which can then be raised so as to transfer the bale onto the turntable. The guide plate or table may be pivotally mounted on main frame 13 for movement about a substantially horizontal axis, between its bale engaging position and a bale transfer position in which it can allow the bale to roll under gravity onto the turntable 16.

Further alternative means which may be used include belt arrangement, or a table with belt and/or rollers.

The turntable 16 is carried by a subframe 29 (see FIG. 5) which is pivotally mounted on the main frame 13 via pivot 30 for movement between a substantially horizontal bale-receiving and wrapping position as shown in FIG. 3, and a tilted position, as shown in FIG. 5, in which the wrapped bale can be discharged under gravity onto the ground at the rear of the apparatus.

The wheels 14 which support the main frame 13 are arranged at the rear end of the main frame, and therefore it can be arranged so that there is only a small vertical drop of a wrapped bale from the rear end of the tipped turntable and onto the ground, so as to minimise the risk of damage or piercing of the film wrapping to take place.

I claim:

1. A bale wrapper apparatus which is capable of being attached to the rear of a propelling vehicle and which is operable to apply stretchable plastics film wrapping around a cylindrical bale and which comprises:
   a main frame;
   a bale-receiving table mounted on the main frame and having a pair of laterally spaced rollers arranged to receive the bale and operable to rotate the bale about its longitudinal axis;
   means for applying a stretchable plastics film around the bale while the latter is rotated about its axis, in order to apply wrapping around the bale;
   a draw-bar connected to the main frame and which can be connected to a towing hitch at the rear of the propelling vehicle;
   an adjustment device operable to vary the inclination of the drawbar relative to the main frame, as seen in plan, so that the table can be adjusted between a transport position behind the propelling vehicle, and a laterally off-set position; and,
   a pick-up mechanism mounted at the front of the apparatus and operative, when the table is in the offset position, to engage a bale lying on the ground and to transfer the bale rearwardly onto the rollers of the table so that bale wrapping can take place.

2. Apparatus according to claim 1, in which the pick-up mechanism comprises a pair of laterally spaced arms which can embrace the end faces of a bale on the ground, and of which at least one arm can be moved so as to cause the end faces of the bale to be firmly gripped between the arms.

3. Apparatus according to claim 2, in which at least one of the arms is pivotable about a substantially vertical axis in order to engage with, or disengage from its respective bale end face.

4. Apparatus according to claim 2, in which the arms of the pick-up mechanism form part of a cradle which can move between a first position for engaging and gripping a bale lying on the ground and a second position in which the gripped bale can be transferred onto the table.

5. Apparatus according to claim 4, in which a ram is coupled with the arms and is operative to move the arms to a bale gripping position, and a further ram is coupled with the cradle to move the cradle between its first and second positions.

6. Apparatus according to claim 5, in which the cradle is pivotable between its first and second positions about a substantially horizontal axis, whereby a bale gripped between the two arms can be raised from the ground by carrying out an arc of movement, and then can fall under gravity onto the rollers of the table upon release of the bale by the gripping arms.

7. Apparatus according to claim 1, in which the bale-receiving table is rotatably mounted on the main frame for rotation about a substantially vertical axis, so that film withdrawn from a dispenser reel fixedly mounted on the main frame can apply film wrapping around the bale.

* * * * *